United States Patent [19]
Itoh

[11] 4,168,676
[45] Sep. 25, 1979

[54] APPARATUS FOR MAKING PAPER CONTAINERS

[75] Inventor: Tsutomu Itoh, Tokyo, Japan

[73] Assignee: Onoda Cement Co., Ltd., Onoda, Japan

[21] Appl. No.: 858,738

[22] Filed: Dec. 8, 1977

[30] Foreign Application Priority Data

Dec. 13, 1976 [JP] Japan .................... 51-148728

[51] Int. Cl.² .............................................. B05B 5/00
[52] U.S. Cl. ...................................... 118/622; 118/624;
118/301; 118/317; 118/504; 229/1.5 B; 427/28
[58] Field of Search .............. 118/622, 624, 625, 301,
118/504, 621, 317; 229/1.5 B; 427/28, 236

[56] References Cited

U.S. PATENT DOCUMENTS

| 2,123,706 | 7/1938 | Biggs | 118/504 X |
| 2,657,150 | 10/1953 | Hermanson | 118/504 X |
| 3,279,937 | 10/1966 | Lopenski | 118/504 X |
| 3,571,897 | 3/1971 | Heil | 118/624 X |

FOREIGN PATENT DOCUMENTS

1272250 8/1961 France ........................ 427/28

*Primary Examiner*—Mervin Stein
*Attorney, Agent, or Firm*—Price, Heneveld, Huizenga & Cooper

[57] ABSTRACT

Forming electric field in and out of the vertical overlap portion, bottom peripheral joint portion and top peripheral rolled portion of a paper cup made of paper or like material lined with a laminate, supplying charged powder particles in the space of said formed electric field to effect powder coating on said portions and with subsequent heat treatment, sealing layers are formed on said portions to become water tight; providing outside electrodes at the outside of said vertical overlap portion and folded portions and providing opposed electrodes in the inside of the paper container, providing a powder supplying means for blowing powder to said sealed portions and masking means for masking the portions not powder coated to securely seal said vertical overlap portion and folded portions.

8 Claims, 19 Drawing Figures

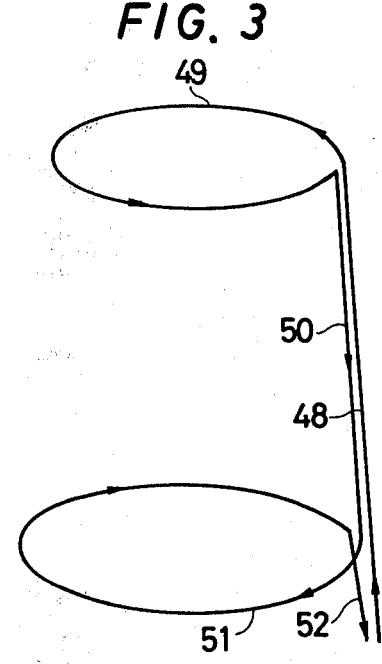
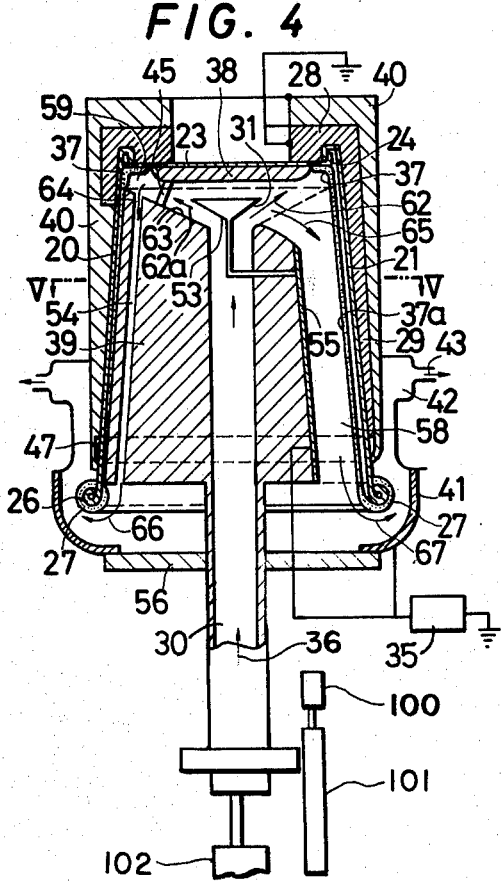
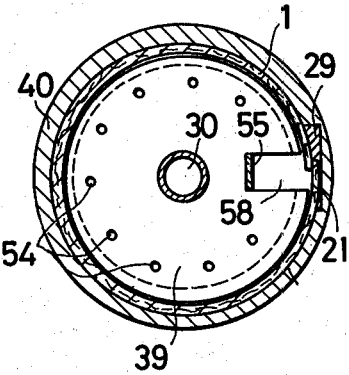

APPARATUS FOR MAKING PAPER CONTAINERS

This invention relates to an apparatus for making a paper container. The paper container of the invention is made of paper or like material lined with a laminate in which essential parts are sealed with synthetic resin layers.

In these days, a great many paper cups are being used in households and parties and more increasingly such are needed for containing instant foods to be sold in stores and slot type selling machines. However such paper cups presently used are not suitable for preserving liquid material for a long time. This is because such cups are made of paper material on which surface is merely applied with wax or laminated with a synthetic resin so as to be watertight containers.

As an example, in a conventional type paper cup, the overlapped portion of the side wall is jointed with an adhesive agent only.

Even though, the cup is made of paper material lined with a laminate, such portion becomes fragile if liquid is filled and left as is for a long time, leakage will occur from such portion. Also in the joint portion of a bottom sheet with the side wall, since the lowest end of the side wall is abruptly folded back for holding the bottom sheet, cracks take place in this portion. This also causes leakage of liquid and other troubles.

Thus there has been not found any method and apparatus that is able to securely and promptly make a paper container with sealing layers effective against leakage, particularly in the overlap portion of its side wall, bottom peripheral portion and around the top rolled portion of paper containers.

Therefore the object of the present invention is to eliminate defects in the conventional type paper cups and to furnish improved method and apparatus for industrially making paper containers for liquid that can be used for a long time.

To achieve the above object for paper containers made by assembling laminated paper sheets to form side wall and bottom sheet, the method of the present invention is such that sending electrically charged powder particles to the overlap portion of the side wall, bottom peripheral joint portion of the bottom sheet and side wall and on the top rolled periphery of paper container for forming sealing layers respectively so as to avoid leakage of liquid and to enable preservation of the contained liquid for a long time.

To perform this method, the apparatus of the present invention is provided with an opposed electrode and outside electrodes in and out of the overlap portion of the side wall and bent portions of the paper container respectively, an element for supplying powder to said essential portions and masking members for covering major areas other than said essential portions where sealing layers are made.

Other objects and features of the present invention will be better understood from the following detailed description of the typical embodiments illustrated in the accompanying drawings in which:

FIG. 3 is a directional course of a moved powder supplying means, diagrammatically shown.

FIG. 4 is a longitudinal section view of another embodiment.

FIG. 5 is a cross section view taken along the line V—V in FIG. 4.

Figure 14:
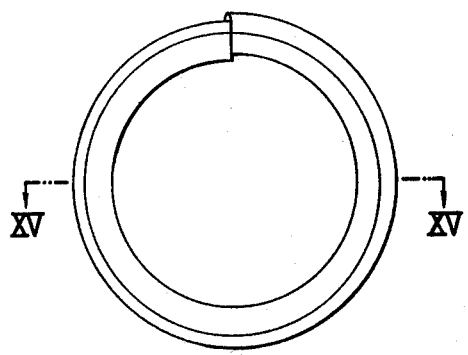
FIG. 14 is a plan view of a conventional type paper cup.
Figure 15:
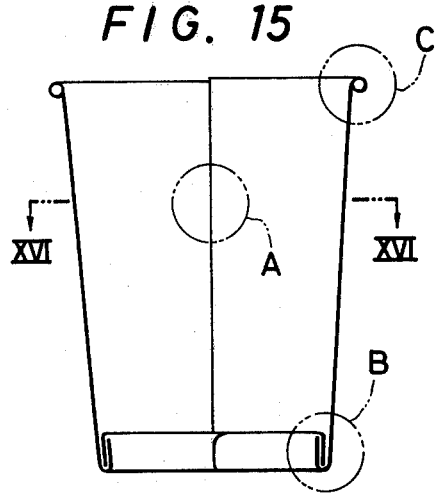

FIG. 15 a longitudinal section view taken along the line XV—XV in FIG. 14.

Figure 16:
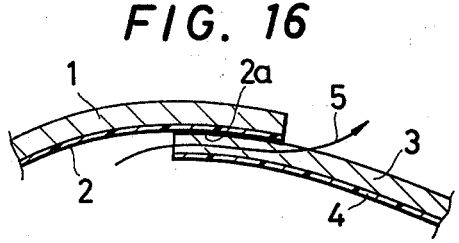

FIG. 16 is an enlarged section view of part A on the section taken along the line XVI—XVI in FIG. 15.

Figure 17:
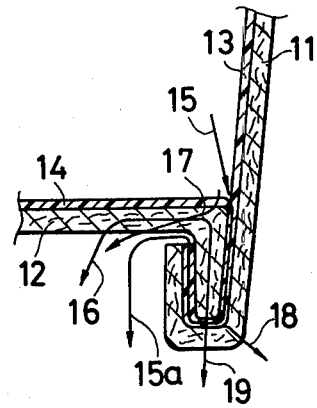

FIG. 17 is an enlarged section view of another part B of FIG. 15.

Figure 18:
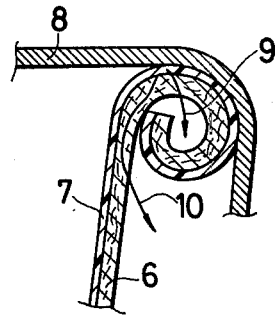

FIG. 18 is an enlarged section view of still another part C of FIG. 15.

Figure 1:
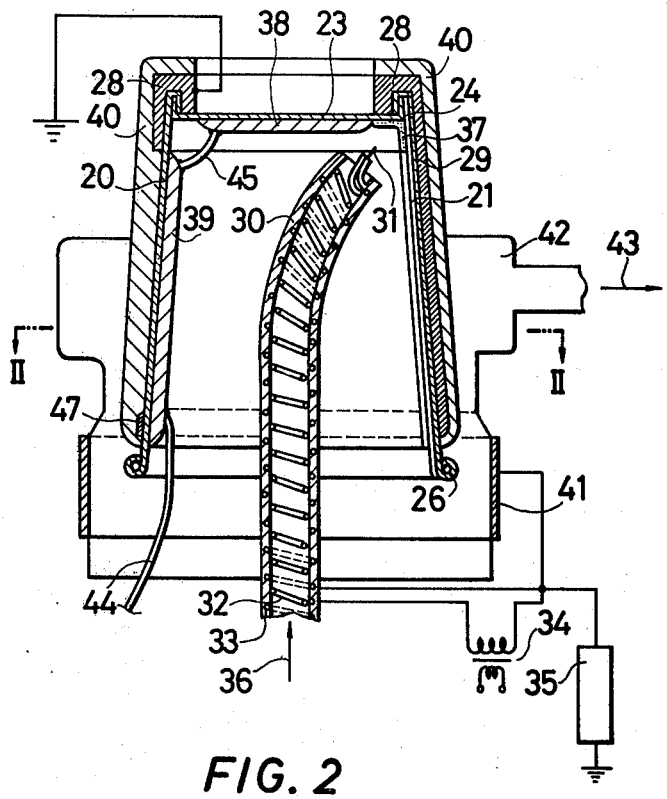
FIG. 1 is a longitudinal cross section view of an apparatus for making up a paper cup housed therein constructed in accordance with the present invention.

In FIG. 1 there is shown a paper cup of the present invention consisting of a side wall 20 and a bottom plate 23 made of paper or like material lined with a laminate. As seen, the paper cup (hereinafter the word paper cup is referred to as a cup made of paper or the like material lined with a laminate but not yet reinforced with coating) is placed with its upside down and therefore the bottom plate 23 is upside and its top, open rolled portion 26 of the side wall is at the bottom. At the outside of the bottom bent portion 24 and close thereto, there is provided an electrode 28. Also on the overlap portion 21 of the side wall, a strip shaped electrode 29 as an extension of said electrode 28 is provided close to the overlap portion of the side wall. Further at the outside of the top peripheral rolled portion of the side wall, an outside electrode 47 as an extension of said electrode 29 is provided to surround said rolled portion. All these electrodes being connected in series their potential is kept identical to that of ground E.

The numeral 40 is an outer shell made of insulating material to hold the paper cup and mechanically connect these electrodes. The numerals 38 and 39 are masking members placed in the paper cut for covering portions which are not to be sealingly coated in the inside of the cup and 44 and 45 are supporters for these masking members respectively. Within the paper cup, a powder supplying pipe 30 is provided. Powder of the same substance to that of the laminate or resineous powder at least that can be heated to moltenly adhere to the synthetic resin of the laminate of the paper cup is sent by air through this powder supplying pipe 30. Preferably the inside of this pipe 30 is so constructed to have the function of electrodynamically repelling powder particles so as not adhere thereto. To this end, in the embodiment shown in FIG. 1, this powder supplying pipe 30 is made of insulator material in which two spiral shape electrodes 32, 33 insulated from each other are arranged in parallel and with an a.c. voltage applying means 34, a.c. voltage having commercially available frequency is applied between these electrodes 32, 33, thereby by repulsion of the a.c. non-uniform electric field produced between these electrodes, powder particles are prevented from depositing on the inner face of the powder supplying pipe 30 and at the same time air for sending powder particles in direction of arrow 36 is kept in small volume so that particles and air blown out of the top end of the powder supplying pipe 30 can be controlled to be low speed. At the top end of this powder supplying pipe 30, a needle type corona discharging electrode 31 connected to the electrode 33 is provided to which a voltage is applied from a high voltage d.c. electric source 35 whereby a slight corona discharge is produced from the tip of the corona discharging electrode 31 to the outside electrodes 28, 29, 47. Powder particles passing around the corona discharging electrode 31 and blown out of the top opening of the powder supplying pipe 30 are electrically charged and by virtue of electric field generated by the electrode 31 directed to the grounded outside electrode 28 through the laminate layer of the inner face of the cup and its back face, base paper material, said charged powder particles being thereby transferred to the face of said laminate thereby ultimately a layer of charged powder particles is formed thereon. The tip of the powder supplying pipe 30 can be moved by a handling means to other positions of the inside of the cup successively keeping a definite distance thereto to form charged powder layers thus to work in a cycle. This can be done by any conventional means such as the motor 100 and gear drive 101 for rotation and the piston and cylinder elements 102 for effecting axial movement (FIG. 4).

Figure 4A:
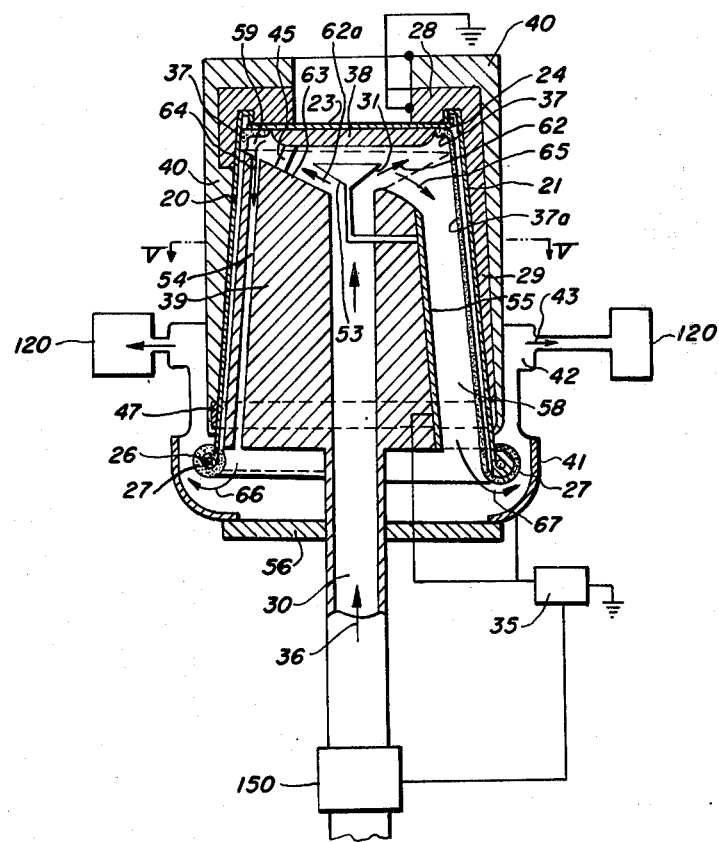
FIG. 4A is a view similar to FIG. 4 showing a modified construction for the embodiment of the invention.

The directional course of this movement is shown as an example in FIG. 3. Firstly the tip of the powder supply pipe 30 is moved upward along the vertical overlap seam portion 21 of the side wall in the direction of arrow 48 and then the tip is moved in a circle as shown by arrow 49 along the bottom peripheral joint portion 24 and again the tip is moved down in a direction of arrow 50 along the overlap seam portion 21. Finally the tip is moved in a circle as shown by arrow 51 along the top peripheral rolled portion 26 of the paper cup and turned to the direction of arrow 52 to the end. This is one cycle of the tip movement, during which a substantial amount of powder to form the predetermined sealing layer 37 is blown from the tip of the powder supplying pipe 30. Since the electrodes are placed at the outside of the paper cup, always a slight corona discharging is kept effectively in the direction of predetermined powder layers to be formed, while the tip of the powder supplying pipe 30 is moved along the course shown in FIG. 3, thus there is formed a continual powder layer 37. In this connection, when coating is to be made around the top rolled portion 26, it is necessary to form powder layers on both of the inside and outside of it so that an auxiliary electrode 41 is provided to apply a voltage having the same polarity of that of the corona discharging electrode 31 from the high voltage d.c. source 35 to thereby form an electric field. At the same time air is suctioned as shown by arrow 43 at an appropriate speed through a duct surrounding the outside of the cup for promoting coating effect, thus layers of a suitable amount of powder can be formed both on inside and outside of the rolled portion 26 of the paper cup. The suction can be created by any suitable means such as a fan or fans 120 (FIG. 4A). In this instance of coating around this top peripheral rolled portion 26, if the electric resistance of paper is very high, it is often not effective. In such instance, for obtaining a good result it is necessary to control the dampness of the paper for reducing its electric resistance. Of course this is true of other portions in applying this method. With this method, it is possible to make coating with high efficiency even when blowing speed of air at the tip of the powder supplying pipe 30 is very low. Since it is important to obtain high production speed and therefore it is preferable to adopt a powder supplying pipe having the function of electrodynamically expelling powder so as to avoid deposition of powder on the inside face of the powder supplying pipe as described in the aforesaid embodiment. However in case the production speed is low, it is not always necessary to adopt such means. Really in such case, in order to sufficiently effect the prevention of powder deposition in the powder supplying pipe with electrodynamic method to securely effect the charging of powder particles at the tip of the powder supplying element, it is preferable to charge the powder particles previously with the predetermined polarity before they are sent to the powder supplying element. This can be accomplished as shown in FIG. 4A wherein a device 150 connected to the source 35 is provided ahead of the powder particle supplying pipe 36. In this instance the polarity of charging may be either of positive or negative depending on the kinds of powder or the quality of paper and so forth. Also if the major object is only to fully perform the operation of the powder supplying pipe, it may be possible to adopt a powder charging means that is able to charge powder particles with both the positive and negative polarities in the mixed state. The masking members 38, 39 are provided as aforesaid to mask the portions of the inside of the paper cup that are not powder coated. These make clear the border where powder layer 37 is formed, thus with such clear border, after making up of the paper cup with heat treatment, its commercial valve is enhanced, and this also minimize the powder consumption. However depending on the purpose of use of the paper cup, it is not always necessary to use the masking members. Also from the standpoint of speed-up of production and preventive maintenance of production plants, often such masking members are not used. Whether such masking members are to be used or not, depends upon and should be determined by the use of the paper cup.

Figure 2:
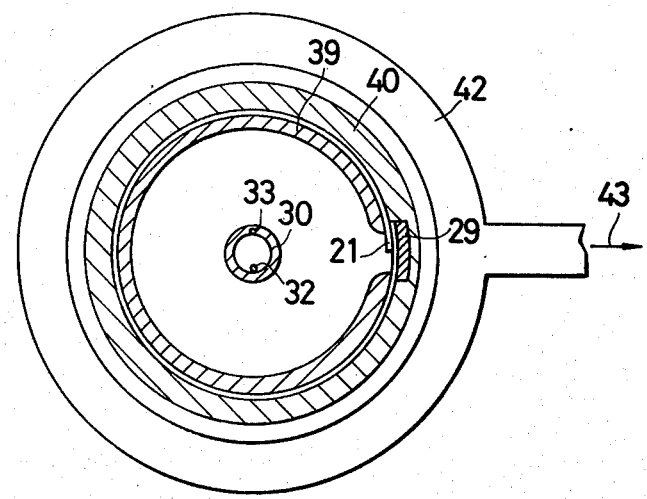
FIG. 2 is a section view through the FIG. 1 unit taken along the line II—II of FIG. 1.

In FIG. 4 and FIG. 5, there is shown another embodiment for the method of making paper containers and the apparatus for doing so. In FIG. 4, a powder supplying element 30 is made integral with masking members 38, 39 and placed in an upside down paper cup. As to the arrangement of outside electrodes it is quite similar to those shown in FIG. 1 and FIG. 2. So its explanation is omitted. As to the air system, this is also substantially the same as that shown in FIG. 1 and FIG. 2. However in case of FIG. 4, an auxiliary electrode 41 for coating the rolled portion 26 is arranged to be connected with the closure 56 which is integral with the powder supplying element 30 and this apparatus is so constructed that the collection of excess powder is more perfectly done. The powder supplying element 30 is positioned approximately in the center of the paper cup and its end opens wide so as to be able to form a powder layer along the whole bottom peripheral joint area 24 of the paper cup. Just above this opening, a corona discharging electrode 31 acting also as a baffle 53 is provided. As this electrode 31 is opposed to the outside electrode 28, an electric field is formed in a space 59 directed from the corona discharging electrode to said opposed electrode and in this space 59 also a slight corona discharge is effected from the corona discharging electrode to the outside electrode 28 whereby powder particles supplied through the powder supplying element 30 in the direction of arrow 36 are directed from said opening in the directions of arrows 62 and 62a with air towards the bottom peripheral joint 24 and powder particles are charged in corona current in the space 59 and by the electric field prevailing therein, are adhered to the bottom peripheral portion 24 to form a powder layer 37. Also at the inside of the vertical overlap portion 21 of the paper cup, a space 58 is formed. This communicates with the top opening 63 of the powder supplying element 30 and its lower end communicates to a duct 42 through which powder flows in direction of arrow 67. Therefore a portion of the powder particles blown from the top opening 63 of the powder supplying element 30 come down through the space 58 in the direction of arrow 65 during the time which these particles are charged by the corona discharging electrode 31. Also along the space 58, an electric field forming electrode 55 is provided in opposition to the electrode 29 at the outside of the overlap portion of the paper cup to which is applied a voltage having identical potential with that of the corona discharging electrode from high voltage d.c. source 35 and by the electric field generated thereby in said space 58, the powder particles having passed through said space 58 are moved towards the vertical overlap portion 21 of the paper cup to form a powder layer 37a.

On the other hand, the other portion of the powder particles blown from the opening of the powder supplying element 30 are, as aforesaid, adheredly coated on the bottom peripheral joint portion to form the powder layer 37 and another portion of the powder particles in the state of being charged flow through channels 54 provided in the masking member down in the directions of arrows 64, 66 and blown from the bottom of the channels and by the electric field formed between the outside electrode 47 and auxiliary electrode 41 form a powder layer 27 on the top peripheral rolled portion 26 of the paper cup.

After a said cycle of operation is over, the powder supplying element 30, masking member 39, closure plate 56 and therewith integral auxiliary electrode 41 are removed from the finished paper cup. Then the paper cup too is removed from the outside electrodes. Thus the paper cup having powder layers formed therein is subjected to subsequent heat treatment and finished as a fabric.

As in the embodiment shown in FIG. 4 and FIG. 5, since this too uses powder supplying means having the function of electrodynamically preventing powder deposition therein and by continually blowing out powder from the outlet opening and by controlling it to be at a low speed, a good result can be obtained. Further with the provision of channels 54 in the masking member, a better result can be obtained. The corona discharging electrode 31 disposed at the outlet opening 63 of the powder supplying element is not always limited to a cone shape. For example if the paper cup is of small size, it may be sufficient with a needle type electrode. Also another type, for example an electrode of plural needles radially extended may be adopted for obtaining a good result. Also disposition of the corona discharging electrode is not always limited to the place near the top opening 63 of the powder supplying element, for example such electrode may be placed around the lower end of the auxiliary electrode 41 for materially charging powder particles depending on the size of paper cups, shape of paper material to be used or the production mass.

Figure 6:
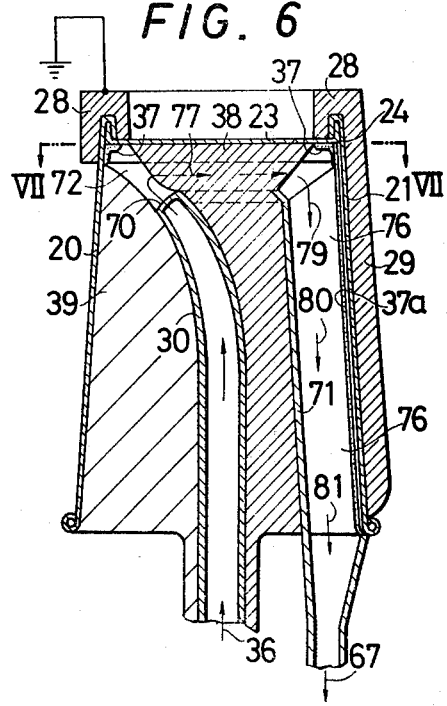
FIG. 6 is a longitudinal section view of a still another embodiment.

In the embodiment of paper cup shown in FIG. 6, the coating layer around its top rolled portion is dispensed with, because this portin can be sealed when a lid is placed thereon. In such construction of paper cups if any defect is found, such may be corrected by other means. Therefore on this cup, coating layers are formed only on the joint portion 24 of the bottom plate and vertical overlap portion 21.

Figure 7:
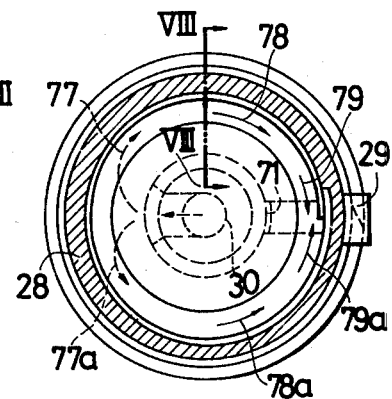
FIG. 7 is a section view taken along the line VII—VII in FIG. 6.

FIG. 7 is a section view taken along the line VII—VII in FIG. 6.

Figure 8:
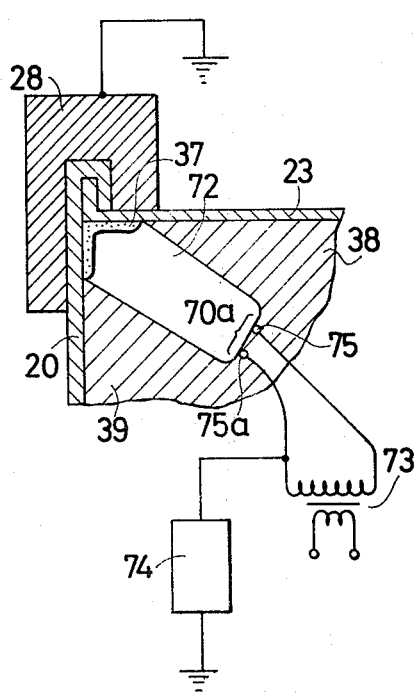
FIG. 8 is an enlarged section view taken along the line VIII—VIII in FIG. 7.

FIG. 8 is a fragmentary enlarged section view taken along the line VIII—VIII in FIG. 7 with electric wiring. The powder supplying element 30 and masking members 38, 39 in FIGS. 6 through 8 are integrally formed and closedly inserted in the paper cup. Like aforesaid described embodiments, outside electrodes 28, 29 are arranged at the outside of the paper cup. Powder particles are supplied to flow up in the direction shown by arrow 36. Since the top end of the powder supplying element 30 opens towards the bottom portion at the side remote from the vertical overlap portion and forms an annular coating chamber 72 from which powder particles entrained in air flow in two directions, one as shown by arrow 77 and the other as shown by arrow 77a. The two streams 79, 79a passing throught the annual coating chamber 72 join in the space 76 just inside of the overlap portion 21 from which the joined stream flow while coating along arrows 79-80-81-67 and are exhausted outside.

In this, like in aforesaid described embodiments, the powder supplying element 30 is so constructed as to have the function of electrodynamic repulsion such that any charged powder particle would not adhere thereto.

Rather the major feature of this embodiment lies in the charging means for powder particles utilizing a silent discharge as shown in detail with electric wiring in FIG. 8 in which an a.c. voltage is impressed through an a.c. voltage applying means 73 to at least one pair of conductive electrodes 75, 75a embedded in the insulator layer formed in the inside of the annular coating chamber 72 as opposed electrodes of the outside electrode 28 whereby a silent discharge is generated in the space 70a of the inside of these electrodes and thereby the produced ionized gas is directed through the annular coating chamber 72 to the outside electrode 28 by D.C. electric field generated by applied volt from high D.C. source 74 to these electrodes whereby powder particles passing through the annular coating chamber 72 in the direction of arrows 77, 77a, 78, 78a in FIG. 7 are charged in a flowing slight ion current and at the same time by electric field generated from the electrodes 75, 75a to the outside electrode 28, the charged powder particles form a powder layer 37.

In such instance the silent discharging electrode to be applied with D.C. voltage is ordinarily placed in the portion of the inside electrode 70 opposed to the outside electrode 28. However as case may be, it had better place it also to the inside electrode 71 for forming an electric field located to be opposed to the outside electrode 29 and for flowing electric current in the space 76 to charge powder particles. However in such instance even when ion current is not allowed to flow in the space 76, it is necessary to form a powder layer 37a by applying D.C. voltage through wiring (not shown in drawings) to the inside electrode 71.

Figure 9:
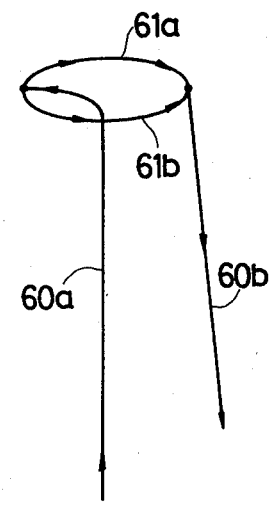
FIG. 9 is a directional course of flowing of powder particles in the apparatus in FIG. 6-8 diagrammatically shown.

FIG. 9 shows a directional course of powder flow in the apparatus referred to in FIGS. 6 through 8. Powder particles suspended in air firstly flow upward in the direction of arrow 60a and then this splits in two half circles 61a, 61b along the bottom peripheral portion 24 of the paper cup and these two streams join at the top of the overlap portion 21 from which it flows down in direction of arrow 60b effecting coating along the way. The excess air is exhausted to the outside.

In the above embodiment, the method of forming an ion current as well as coating electric field by means of silent electrodes by applying a d.c. voltage is found to be very effective. For example in FIG. 8, since the a.c. non-uniform electric field having an outward force is generated in the space 70a between the electrodes 75 and 75a by impression through a.c. voltage means 73, powder particles are repelled outwardly whereby powder deposition is prevented in this area, thus the stable discharging current and electric field are always secured. Accordingly for example instead of the corona discharging electrode 31 shown in FIG. 4, silent electrodes as shown in FIG. 8 may possibly be utilized to bring forth a better result. Similarly by using silient electrodes in FIG. 8 instead of the electrode 55 of the overlap portion 21 for forming electric field, it often brings forth a better result. Also such silient electrode may be used in a portion of the auxiliary electrode 41 in FIG. 4 thereby powder particles flowing therearound are more securely charged, thus it often brings forth a good result.

In the above embodiment, the electrodynamic repulsive function provided in the powder supplying pipe is not always limited to two-phase a.c. field since also three-phase can be employed for the function of not only repelling particles but also for transferring particles. This feature is to be included in the embodiment of the present invention.

In the above, the explanation is made for the paper cup in the state of being upside down with its opening at the bottom.

However, this is not always limited so. It is to be noted, depending on the handling tools, shape of paper cup and so forth, that the coating layer may be applied to any cup by placing it with its opening up or with its side down.

Also in the above, an explanation is applied to an ordinary cup that does have a round cross section and tapered downward. In this respect, the present invention can be applied not only to this, but it can be applied to cylindrical shape cups without a taper and also to square shape containers for containing butter or margarine or to cups of pyramid shape. Thus with the method and apparatus of the present invention, paper containers of any shape for liquid may be made. Further by assembling such means for transferring, charging and forming an electric field, more effective powder coating may be practised.

Heretofore, the description has been made regarding paper material, particularly, paper material lined with a synthetic resin laminate. However the material is not limited only thereto. The present invention can be applied to any paper material for example that laminated with an aluminum foil on top or/and back face of it and further thereover laminated with a synthetic resin layer may be used for making a paper cup. In this instance, the aluminum foil itself can be utilized as an outside electrode in putting the present invention to practice. Usually when a paper material sheet does have laminates on both faces, usually that of the inner face is made thicker than that of the outer face.

The use of paper containers made according to the present invention is not always limited to those for containing liquid. Particularly by forming sealing layers on the cup made by assembling these of aluminum foil, it can be used for containing any article other than liquid for keeping its fragrance with its airtight construction. Such may be produced with high effieciency yet at low cost. This of course to be included in the present invention.

Figure 10:
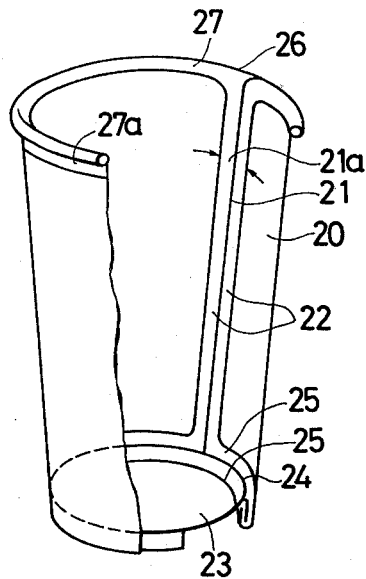
FIG. 10 is a diagrammatic view of a paper cup of the present invention showing its essential parts, partly cut away.

Shown in FIG. 10 is a typical paper cup constructed according to the method and apparatus of the present invention. That is, the paper cup of the present invention is made of a combination of paper material forming the side wall 20 and bottom plate 23, each paper material being laminated with synthetic resin film to become the inner wall of the cup. Its side wall has a specified width 21a in both sides of the vertical overlap seam portion 21 yet is seemingly continually formed. A vertical sealing layer 22 is formed by closely adhering it to the laminated layer of the inside face of the side wall. Also a sealing layer 25 is formed on the bottom peripheral joint portion 24 and a sealing layer 27 on the top face rolled portion 26 and an inner face sealing layer 27a of the same rolled portion 26. More detailed construction of these are shown in FIGS. 11 through 13.

Figure 11:
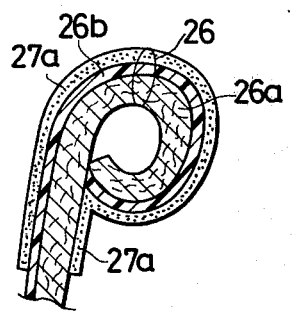
FIG. 11 is a fragmentary enlarged section view of a part of FIG. 10.

Shown in FIG. 11 is a top rolled portion of the cup in which the basic paper material 26a is seen in the innermost position and covered by a laminate 26b and thereover sealed by a sealing layer 27a extending from the outside to the inside of the top periphery rolled portion of the cup.

Figure 12:
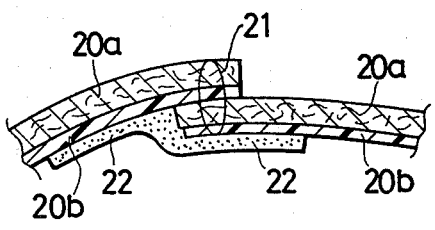
FIG. 12 is a fragmentary enlarged section view of another part of FIG. 10.

Shown in FIG. 12 is the vertical overlap portion in which the layers are in order from the outermost to the innermost, the basic paper material 20a, the laminate 20b, basic paper material 20a, the laminate 20b and to this, the overlap portion is coated by the innermost sealing layer 22.

Figure 13:
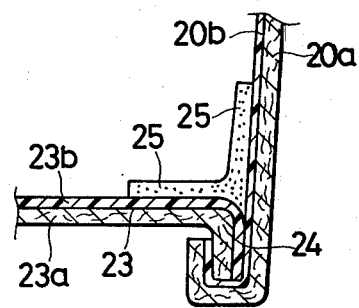
FIG. 13 is a fragmentary enlarged section view of still another part of FIG. 10.

Also shown in FIG. 13 is a bottom peripheral joint portion 24 in which the outermost basic paper 20a with inside laminate layer 20b is folded back and a basic paper material 23a with its laminate layer 23b of bottom plate 23 is inserted in said folded back portion and a sealing layer 25 is coated on the innermost peripheral bottom portion.

As described above since the fragile portions as the side wall overlap portion, bottom joint portion and top opening peripheral rolled portion are all completely sealed any leakage of liquid will never occur. With the method of electrostatic coating of the present invention, liquid in the cup will be preserved for a long time and may be transferred without any trouble to a distant place.

To further clarify the feature of paper containers of the present invention, comparison is made with the conventional one as referred to in FIG. 14–FIG. 18.

The typical conventional paper cup is such that, as particularly seen in FIG. 16, the base paper material 1 is laminated with a synthetic resin layer 2 and another basic paper material 3 is similarly laminated with a synthetic resin layer 4. In such paper cup made of laminate paper material as these two materials are joined only with an adhesive layer 2a, liquid tends to penetrate from one end of the base paper 3 into the fine texture of the paper itself and therefore leakage tends to occur in a direction of arrow 5 and the laminate layer can not perform its watertight junction. Therefore such paper cup is not suitable for preserving liquid for a long time.

To avoid such leakage, it has been practise to seal the paper exposed in the inside face of the cup by spraying wax thereon. This may be somewhat effective if the laminate material is wax. However such cup can not be used as a container for high temperature articles and moreover, since such tends to physically wear off, its use is very limited.

Another method is to seal such portion by applying a solution of synthetic resin. However if the polyolefineous resin is used as a laminate on the inside face of paper cups, though mostly done so now, it is not suitable to adopt this method, since the polyolefine itself is not soluble with usually used solvents and moreover no adhesive has been found having a good adhesion effect with the polyolefine. Therefore for paper cups laminated with polyolefineous resin, it has been deemed very difficult to find a way to avoid the leakage in the direction shown by arrow 5. This is one reason why the paper cups may be only laminated paper sheets can not be used as liquid containers for a long time.

FIG. 17 is an enlarged section view of the bottom peripheral joint portion B in FIG. 15. In this instance, also it is very difficult to completely seal the laminate layer 13 of side wall paper base 11 with the laminate 14 of base paper sheet 12 since from this portion, leakage tends to occur in a direction of arrow 15a and also in a direction of arrows 15, 16. Further in respect of this portion, since the bottom paper sheet 12 is bent substantially at a 90° angle, a crack tends to take place in the laminate layer 14 in this bent portion, leakage often occurs in a direction of arrow 17. Similarly leakages of liquid due to the abrupt bending tend to occur in direction of arrows 18, 19. This is a second reason why the paper cup made of assembled laminate papers can not be used as a paper container for liquid for a long time.

FIG. 18 is an enlarged fragmentary view of the rolled portion C of the cup in FIG. 15. Usually in this portion, the base paper 6 with a laminate layer 7 thereon is rolled. When this is to be used with a lid 8 of aluminum foil, usually the top periphery is sealed with a lid by heat treatment to cause the laminated resin to be moltenly adhered to it. In this instant too, cracks tend to take place in the laminate at the rolled portion whereby when the cup filled with liquid is turned down, leakages shown by arrows 9, 10 tend to occur. This a third reason why such a paper cup assembled by laminate papers can not be used as paper cup.

The present invention is contemplated to furnish improved paper cups that can eliminate the defects in said three examples and to establish the most optimum method and apparatus for making the paper cups that are suitable for preserving liquid therein for a long time.

What is claimed is:

1. Apparatus for powder coating a paper container made of paper material lined with a laminate and having a side wall overlap portion and folded portions, said apparatus comprising outside electrodes disposed at the outside of the overlap portion of the side wall and folded portions respectively, means for supplying powder to said portions to be sealed, an electrode generating an electric field directed to said outside electrodes through a space near the said overlap portion and folded portions against the face of the laminate and its back base paper.

2. Apparatus for powder coating a paper container as claimed in claim 1 characterized in the provision of masking members for masking portions other than the area where sealing is made by said overlap and folded portions.

3. Apparatus for powder coating a paper container as claimed in claim 1 characterized in that said powder supply means has a top end having an opening substantially in the center of the paper cup and directed towards the bottom peripheral folded portion, said electrode being a corona discharging electrode.

4. Apparatus for powder coating a paper container as claimed in claim 1 characterized in that as a means for charging powder, at least a silent discharging electrode is provided as a part of opposed electrodes and provision of a means for impressing a d.c. voltage between said outside electrode and said field generating electrode.

5. Apparatus for powder coating a paper container as claimed in claim 1 characterized in that an electrodynamic powder repelling means is provided for said powder supplying means to assure movement of powder therethrough.

6. Apparatus for powder coating a paper container as claimed in claim 1 characterized in that a charging means is provided for charging the powder and giving it a polarity before it is sent to the powder supply means.

7. Apparatus for powder coating a paper container as claimed in claim 1 characterized in that said powder supplying means has an opening at its power discharge end; a corona discharging electrode in its opening as an electrode opposed to the outside electrode and a handling means is provided to move said powder supplying means while keeping a fixed position of the opening relative to the outside electrode and overlap portion and folded portions to move it at least once with a predetermined speed along said overlap portion and folded portions.

8. Apparatus for powder coating a paper container as claimed in claim 1 characterized in that suction means is provided; said powder supplying means for blowing powder in the proximity of said overlap portion and folded portions being connected to said suction means for removing excess powder.

* * * * *

UNITED STATES PATENT AND TRADEMARK OFFICE
CERTIFICATE OF CORRECTION

PATENT NO. : 4 168 676
DATED : September 25, 1979
INVENTOR(S) : Tsutomo Itoh

It is certified that error appears in the above–identified patent and that said Letters Patent are hereby corrected as shown below:

Column 2, line 57:

"cut" should be --cup--

Column 2, line 62:

"resineous" should be --resinous--

Column 4, line 43:

"valve" should be --value--

Column 6, line 13:

"portin" should be --portion--

Column 6, line 35:

"throught" should be --through--

Column 6, lines 35, 36:

"annual" should be --annular--

Column 7, line 33:

"silient" should be --silent--

Column 7, line 64:

"practised" should be --practiced--

UNITED STATES PATENT AND TRADEMARK OFFICE
CERTIFICATE OF CORRECTION

PATENT NO. : 4 168 676
DATED : September 25, 1979
INVENTOR(S) : Tsutomo Itoh

It is certified that error appears in the above-identified patent and that said Letters Patent are hereby corrected as shown below:

Column 8, line 16:

"effieciency" should be --efficiency--

Column 9, line 7:

"junction" should be --function--

Column 9, line 9:

"practise" should be --practice--

Column 9, line 28:

"may be" should be --made by--

Column 9, line 56:

"by" should be --of--

Signed and Sealed this

Eighteenth Day of March 1980

[SEAL]

Attest:

SIDNEY A. DIAMOND

Attesting Officer   Commissioner of Patents and Trademarks